United States Patent [19]

Vuylsteke et al.

[11] Patent Number: 5,461,655
[45] Date of Patent: Oct. 24, 1995

[54] METHOD AND APPARATUS FOR NOISE REDUCTION

[75] Inventors: Pieter Vuylsteke, Mortsel; Piet Dewaele, Berchem, both of Belgium

[73] Assignee: AGFA-Gevaert, Mortsel, Belgium

[21] Appl. No.: 75,731

[22] Filed: Jun. 11, 1993

[30] Foreign Application Priority Data

Jun. 19, 1992 [EP] European Pat. Off. .............. 92201802

[51] Int. Cl.⁶ .................................................. G01N 23/04
[52] U.S. Cl. .............................. 378/62; 378/901; 395/128
[58] Field of Search ....................... 364/413 B; 395/128; 378/62, 901

[56] References Cited

U.S. PATENT DOCUMENTS

| | | | |
|---|---|---|---|
| 4,649,482 | 3/1987 | Raviv et al. | 364/413.05 |
| 4,984,160 | 1/1991 | Saint Felix et al. | 364/413.19 |
| 5,319,696 | 6/1994 | Abdel-Malek et al. | 378/108 |

Primary Examiner—David P. Porta
Assistant Examiner—David Vernon Bruce
Attorney, Agent, or Firm—Richard J. Birch

[57] ABSTRACT

A noise reducing method and associated apparatus for use in a medical radiographic imaging system wherein an image represented by an array of pixels is processed and the processed image is recorded on a recording medium or visualized on a display monitor. The processing comprises the steps of a) decomposing an original image into a sequence of detail images or into an array of coefficients representing detail strength at multiple resolution levels and a residual image, b) pixelwise attenuating the detail images or the coefficient arrays according to the locally estimated amount of relevant signal present and in accordance with an estimated noise level, c) reconstructing a processed image by accumulating detail obtained from the attenuated detail images or from the attenuated detail coefficients, and further adding the residual image.

25 Claims, 9 Drawing Sheets

| 0.0025 | 0.0125 | 0.02 | 0.0125 | 0.0025 |
| --- | --- | --- | --- | --- |
| 0.0125 | 0.0625 | 0.1 | 0.0625 | 0.0125 |
| 0.02 | 0.1 | 0.16 | 0.1 | 0.02 |
| 0.0125 | 0.0625 | 0.1 | 0.0625 | 0.0125 |
| 0.0025 | 0.0125 | 0.02 | 0.0125 | 0.0025 |

METHOD AND APPARATUS FOR NOISE REDUCTION

FIELD OF THE INVENTION

This invention relates to a noise reduction method and to an apparatus for reducing the noise of a digital image.

More in particular it relates to such method for use in a medical radiographic imaging system, such as a computed radiography system.

BACKGROUND OF THE INVENTION

Images obtained from image sensing devices always contain noise to some extent. In the application field of medical Rx-imaging there exists a well known tradeoff between diagnostic image quality and patient dose, due to the presence of noise in the radiation source.

Linear and nonlinear filters are widely used in image processing applications to reduce the noise level. Linear filters perform very well in attenuating the noise component, but at the same time this category of filters smear the edges and small structures within the image. In this respect many nonlinear filters preserve edges much better, such as described in the paper: Fong Y. S., Pomalaza-Raez C. A., Wang X. H., "Comparison study of nonlinear filters in image processing applications", Optical Engineering, vol. 28, no. 7, pp. 749–760, July 1989.

Ideally the filter parameters should be adjusted to the local image statistics. A basic adaptive noise filtering method is described in: Lee J. S., "Digital Image Enhancement and Noise Filtering by use of Local Statistics", IEEE Trans. on Pattern Analysis and Machine Intelligence, vol. 2, no. 2, pp. 165–168, March 1980. Typically the local variance is used to control the degree of smoothing.

Until now research on noise filtering in place domain was focused on local operators with a fixed size. These kind of filters perform optimally only if the noise spatial spectrum is confined to a narrow band, usually the higher frequency portion of the image spectrum. If the noise band is not very narrow, larger filter sizes must be used, and artifacts are likely to occur in regions of abruptly changing statistics such as in the vicinity of edges. Filters known as 'sigma filter', or 'adaptive mean filter' as they are called in the above comparative study of Wong et al. provide a solution to this problem, but they are computationally expensive.

In the field of digital image processing a novel paradigm of multiresolution computation has evolved the last decade, sometimes called pyramidal image processing. According to this concept multiple sets of processing parameters are used, tuned to a wide range of detail sizes. The basic concepts and efficient implementations of pyramidal decomposition are described in: Burt P. J., "Fast Filter Transforms for Image Processing", Computer Graphics and Image Processing, vol. 16, pp. 20–51, 1981; Crowley J. L., Stern R. M., "Fast Computation of the Difference of Low-Pass Transform", IEEE Trans. on Pattern Analysis and Machine Intelligence, vol. 6, no. 2, ; March 1984.

Alternative multiresolution representations are presented in: Mallat S. G., "A Theory for Multiresolution Signal Decomposition: The Wavelet Representation", IEEE Trans. on Pattern Analysis and Machine Intelligence, vol. 11, no. 7, July 1989; Ebrahimi T., Kunt M., "Image compression by Gabor Expansion", Optical Engineering, vol. 30, no. 7, pp. 873–880, July 1991.

Until now the main purpose of these kind of image processing techniques has been directed towards image compression.

Other applications include multiresolution image segmentation, image interpolation, and filter synthesis with specified frequency response. A novel application of multiresolution decomposition for the purpose of contrast enhancement is disclosed in an unpublished european patent application 91202079.9 filed Aug. 14, 1991.

A multiresolution noise filtering algorithm is proposed in: Ranganath S., "Image Filtering Using Multiresolution Representations", IEEE Trans. on Pattern Analysis and Machine Intelligence, vol. 13, no. 5, pp. 426–440, May 1991. According to the paradigm described in this paper, a sequence of low pass approximations of the original image at successively coarser resolution levels are computed, and adaptive noise suppression is achieved by linearly combining all levels at every pixel position, the weight coefficients being adapted to the local noise statistics at every pixel.

In Pattern Recognition Letters, vol. 12, no. 8 of August 1991 an article entitled 'Edge preserving artifact free smoothing with image pyramids' has been published. This article discloses a smoothing method in which smoothing is performed by assigning the local mean of non-overlapping pixel blocks of sizes either 8×8, 4×4, or 2×2 to all pixels of the block, depending on whether the block is homogeneous or not (assignment starting with the larger block sizes). Pixels which do not belong to a homogeneous block of any size are assigned a value which is a weighted average of the input pixel value and the 2×2 local mean. Assigning identical values to blocks of pixels inherently causes so called "block artifacts", a problem being recognized in the same reference.

OBJECT OF THE INVENTION

It is a principal object of the present invention to provide a method for reducing the noise level in a digital image.

Another object of the present invention is to provide a method for suppressing noise in a digital image without significantly reducing the relevant signals, so that the signal to noise level increases.

Another object of the present invention is to provide a method for reducing the noise level in a digital image without blurring the edges.

Another object of the present invention is to provide a method for reducing the noise level in a digital image over a wide spatial frequency band.

A further object of the present invention is to provide a method for reducing the noise level in a digital image without having prior knowledge of the signal to noise ratio.

A still further object of the present invention is to provide a method which combines edge preserving noise suppression with contrast enhancement so that excellent contrast can be achieved without boosting the inherent image noise to a disturbing level.

A still further object of the present invention is to provide a method for reducing the noise level in digital images with essentially poisson distributed noise, such as images obtained from digital radiography and computed tomography.

A still further object of the present invention is to provide an apparatus for reducing noise with the above mentioned features.

SUMMARY OF THE INVENTION

We have found that the above objectives can be met by applying a method for reducing noise in a digital image represented by an array of pixel values by processing said image, said processing comprising the steps of:

a) decomposing said image into a multiresolution representation comprising a set of detail images at multiple resolution levels and a residue,
b) estimating the noise level in each detail image or recalling said noise level from a noise table comprising predetermined typical noise level values corresponding to detail images with similar noise statistics;
c) establishing a local observation neighborhood around each pixel of each detail image and estimating local image content within said neighborhood,
d) pixelwise attenuating the detail images as a function of the estimated amount of image content and in accordance with said estimated noise level,
e) computing said processed image by applying a reconstruction algorithm to the residue and to the attenuated detail images, said reconstruction algorithm being such if it were applied to the residual image and the detail images without attenuation, then said digital image or a close approximation thereof would be obtained.

Typically the noise level is determined as the noise variance in each detail image.

According to a specific embodiment of the method of the present invention a set of noise suppression functions corresponding to each detail image are computed, said functions being monotonically non-decreasing in one variable and parametrically depending on said noise variance in a non-increasing monotonic way, said functions being positive and asymptotically reaching a maximum value equal to one. Each detail image is attenuated by multiplying it with the corresponding noise suppression function evaluated at an abscissa value equal to said local detail image variance.

Specific embodiments of methods for decomposing the image representation into approximation images at different resolution levels and into a residual image and of the corresponding reconstruction process are described extensively in european patent application 91202079.9, one embodiment of this method is described hereinbelow with reference to the drawings.

Preferably the multiresolution representation has a pyramidal structure such that the number of pixels in each detail image decreases at each coarser resolution level.

Further details as to the decomposition of the image into a multiresolution representation are also given further on in relation to the drawings.

Our method differs from the prior art method described in the article published in Pattern Recognition Letters, vol. 12, no. 8 of August 1991 which was mentioned in the introductory part of this application in the following aspects.

The pyramid representation in our application the mentioned pyramid is a detail pyramid. Detail pixels or transform coefficients are essentially differential quantities, which indicate the difference between two approximations of the original image at subsequent resolution levels. Since detail is differential, smoothing can be done simply by attenuating detail.

The above prior art reference does not mention a detail pyramid representation, only pyramids of spatial mean and variance values are considered.

The way in which smoothing is performed in the prior art reference has been described in the introductory part of this application and differs from our method in that in our method smoothing is performed by attenuating detail (pixel or transform coefficients) at different resolution levels and accumulating attenuated detail starting from some intermediate level approximating the image, up to the finest resolution level.

Hence, blocking artifacts will not appear as long as detail is represented by continuous functions.

In the prior art reference the noise level is computed using a known mode estimation technique, based on spatial variances of the original image, the variance values are computed in the course of building two pyramids: one for the original image and one for the squared original.

In our method the estimation of the noise level applies to detail, i.e. differential information, being either bandpass images or detail transform coefficients. This is done for each of the finer resolution levels independently, and the resulting noise levels are used as a reference for controlling noise reduction at the same resolution levels. As a consequence of this approach the estimated noise levels (and hence the net smoothing effect) will dramatically decrease with increasing resolution, since the lower resolution bandpass images (or transform coefficient planes) actually contain much less noise than the higher.

In accordance with another embodiment the decomposition is performed by applying a transform to said image yielding detail transform images at multiple resolution levels and a residual coefficient, each detail transform image comprising a set of transform coefficients expressing the relative contribution to the original image of the corresponding basis function out of a set of predetermined basis functions, each of said functions representing local detail at a specific resolution level and being non-periodic, and having zero mean value, and wherein said transform is characterized in that there exists an inverse transform which returns the original image or a close approximation thereof when being applied to said transform coefficients and said residual coefficient.

The method further comprises the steps of
estimating the noise level in each transform image or recalling said noise level from a noise table comprising predetermined typical noise level values corresponding to transform images with similar noise statistics;
establishing a local observation neighborhood around each pixel of each transform image, estimating local image content within said neighborhood,
pixelwise attenuating the transform images as a function of the estimated amount of image content and in accordance with said estimated noise level.

Finally a reconstruction step is performed consisting of computing a processed image by applying said inverse transform to said attenuated detail transform images and said residual coefficient.

In a preferred embodiment said basis functions are orthogonal. Preferably they are discrete wavelets.

The present invention further discloses an apparatus for processing an electronic representation of an image comprising
means for decomposing said electronic representation into a sequence of detail images at multiple resolution levels and a residual image at a resolution level lower than the minimum of said multiple resolution levels,
means for storing said detail images,
means for estimating the noise level in each detail image or recalling said noise level from a noise table comprising predetermined typical noise level values corresponding to detail images with similar noise statistics,
means for estimating local image content within a neighborhood around each pixel in each detail image,
means for determining an attenuation coefficient as a function of the estimated amount of image content and in accordance with said estimated noise level,
means for pixelwise attenuating each detail image by multiplication by said attenuation coefficient, means for computing said processed image by applying a reconstruction algorithm to the residual image and the attenuated detail images, said reconstruction algorithm being such that if it were applied to the residual image and the detail images without attenuation, then said original image or a close approximation thereof would be obtained.

Preferably said apparatus comprises means for computing the local variance of pixels in a neighborhood, means for storing said local variance, a histogram computation circuit for computing the histogram of the computed local variance values, a maximum locator for determining the variance value with the highest occurrence in the histogram, means for reading out detail images from said storage means, means for calculating a noise suppression coefficient as a function of local detail image variance at each resolution level, and a multiplier for pixelwise multiplying each detail image at a particular resolution level with the corresponding suppression coefficient.

The representation of the image in the form of an array of pixels is commonly obtained by means of an image acquisition section being any apparatus or part thereof for obtaining an electronic representation of an image. For application in the medical field the acquisition unit can be an apparatus wherein an electronic representation of an image is obtained directly such as a medical scanner or a tomography apparatus, an image intensifier, etc. or alternatively an apparatus wherein an electronic representation is obtained through the intermediary of a storage device such as a radiographic film or a photostimulable phosphor screen.

After processing the image can be applied to an output apparatus such as a hardcopy recording apparatus, for example a laser printer or a thermal printer or a visual display apparatus such as a monitor.

BRIEF DESCRIPTION OF THE DRAWINGS

Further details relating to an apparatus as well as to different embodiments of the method of the present invention are described hereinbelow with reference to the drawings wherein.

DETAILED DESCRIPTION OF A PREFERRED EMBODIMENT

Figure 1:
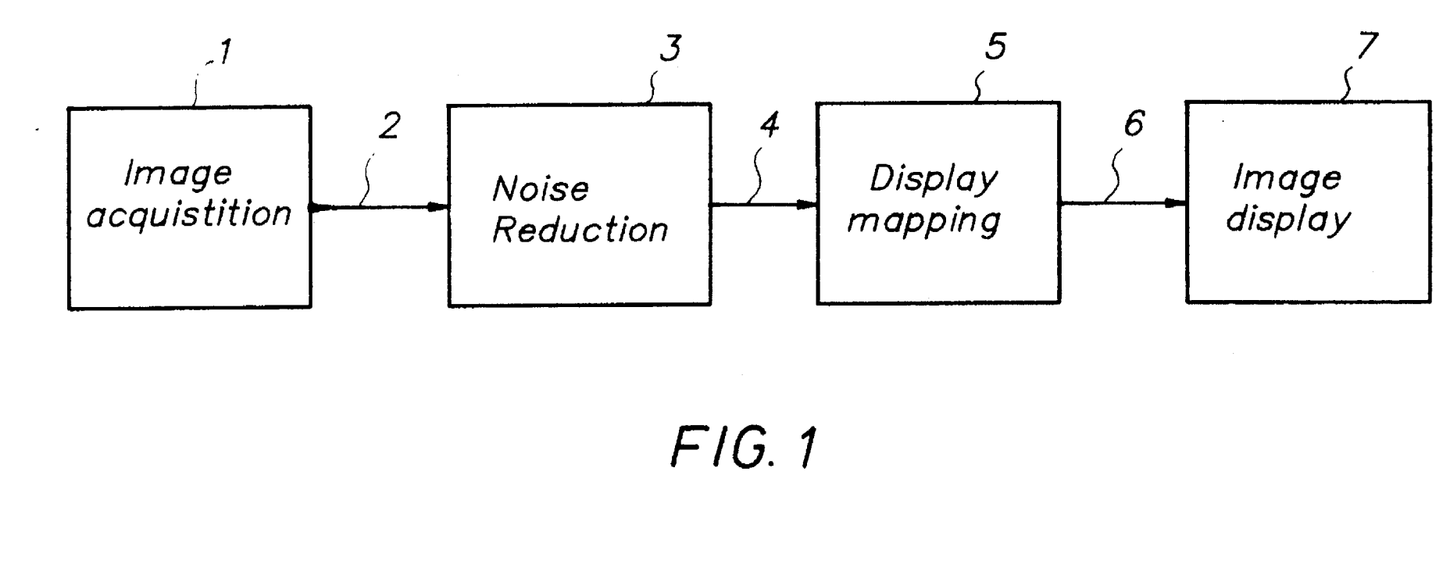
FIG. 1 is a block scheme generally illustrating an apparatus according to the present invention.

A simplified block diagram is shown in FIG. 1. An image acquisition unit 1 acquires a digital image by sampling the output signal of an image sensor, such as a CCD sensor, a video camera, an image intensifier or an image scanner, quantizes it using an A/D convertor into an array of pixelvalues, called raw or original image 2, with pixelvalues typically 8 to 12 bits long, temporarily stores the pixelvalues in memory if desired, and transmits the digital image 2 to a noise reduction unit 3, where the noise content is reduced in accordance with the present invention, next the enhanced image 4 is transmitted to the display mapping section 5 which modifies the pixel values according to a contrast curve, such that the relevant image information is presented in an optimal way, when the processed image 6 is visualized on an image output device 7, which produces either a hardcopy on transparent film or on paper, or a viewable image on a display screen (CRT).

Figure 2:
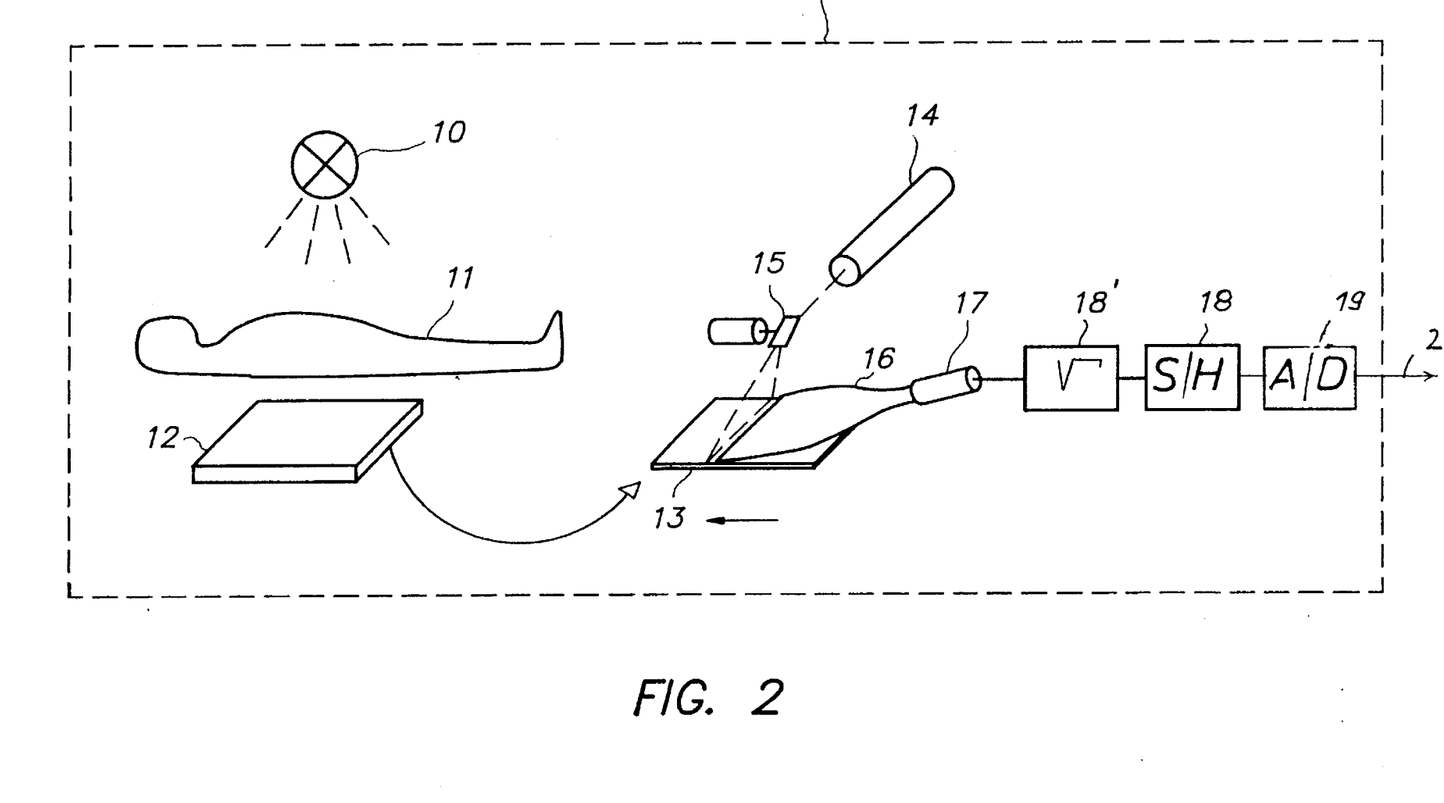
FIG. 2 is a specific embodiment of an image acquisition apparatus.

A preferred embodiment of image acquisition unit 1 is shown in FIG. 2. A radiation image of an object 11 or part thereof, e.g. a patient is recorded onto a photostimulable phosphor plate by exposing said plate to X-rays originating from an X-ray source 10, transmitted through the object. The photostimulable phosphor plate 13 is conveyed in a cassette 12. In a radiation image readout apparatus the latent image stored in the photostimulable phosphor plate is read out by scanning the phosphor sheet with stimulating rays emitted by a laser 14. The stimulating rays are deflected according to the main scanning direction by means of a galvanometric deflection device 15. The secondary scanning motion is performed by transporting the phosphor sheet in the direction perpendicular to the scanning direction. A light collector 16 directs the light obtained by stimulated emission onto a photomultiplier 17 where it is converted into an electrical signal, which is next amplified by means of a square root amplifier 18' sampled by a sample and hold circuit 18, and converted into a 12 bit digital signal by means of an analog to digital converter 19. From there the digital image 2, called raw or original image, is sent to the noise reduction section 3.

The square root characteristic of the amplifier 18' converts the signal in such a way that the noise level within the original image 2 is nearly independent of the signal amplitude, although the signal resulting from the photomultiplier is nearly poisson distributed. This kind of preprocessing is explicitly done with this type of image source within the context of the present invention; it is not required however in those cases where the acquired images already have signal independent, additive noise statistic.

The use of a square root amplifier has additional advantages especially when compared with the commonly used logarithmic conversion. These advantages are described hereinbelow.

As a consequence of A/D conversion of a linear signal the ratio of the value of the least significant bit to the standard deviation of the signal continuously decreases.

In case of a logarithmic conversion of a linear signal before A/D conversion the number of significant bits does not decrease as fast as the standard deviation of the signal.

Both situations give rise to an unefficient use of the resolution of the A/D convertor.

Square root compression that takes into account the Poisson distribution inherent with the detection of a limited number of x-ray quanta per pixel optimally uses the resolution of the A/D convertor.

Further, non-linear compression involves a trade-off between amplitude and bandwidth of the signal. Since logarithmic compression is stronger than square root compression, it will generate more high frequency components.

To avoid aliasing, the bandwidth of the system must be restricted to half the sampling frequency. Restricting the bandwidth will inevitably remove some of the high frequency components generated during non-linear compression. As a result the waveform that is reconstructed from digitized data, which were logarithmically compressed prior to A/D conversion will show more harmonic distortion than an identical waveform reconstructed from data that were compressed with a square root characteristic.

Figure 3A:
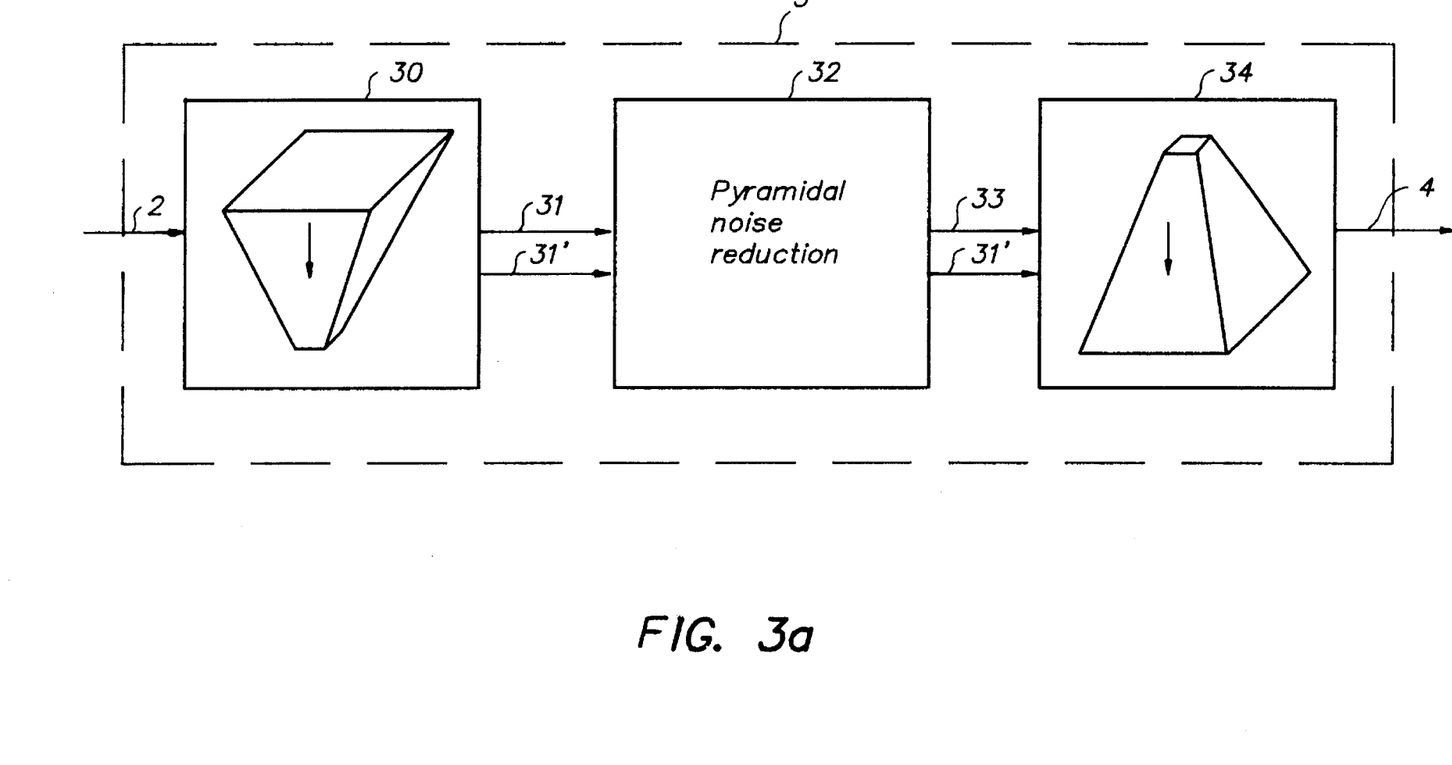
FIG. 3a is a block scheme illustrating the different steps of the noise reducing system.

The noise reduction system 3 consists of three main parts, schematically drawn in FIG. 3a. In a decomposition section 30 the original image 2 is decomposed into a sequence of detail images, which represent the amount of detail present in the original image at multiple resolution levels, from fine to coarse.

After the last decomposition step a residual image 31' may be left. The resulting detail images 31, which represent the amount of local detail at successive resolution levels are next supplied to the pyramidal noise reduction section 32, where the detail images are pixelwise attenuated as a function of the locally estimated amount of relevant signal content. In the image reconstruction section 34 the noise reduced detail images 33 are next accumulated at all resolution levels, along with the residual image 31' to compute the enhanced image 4.

Figure 3B:
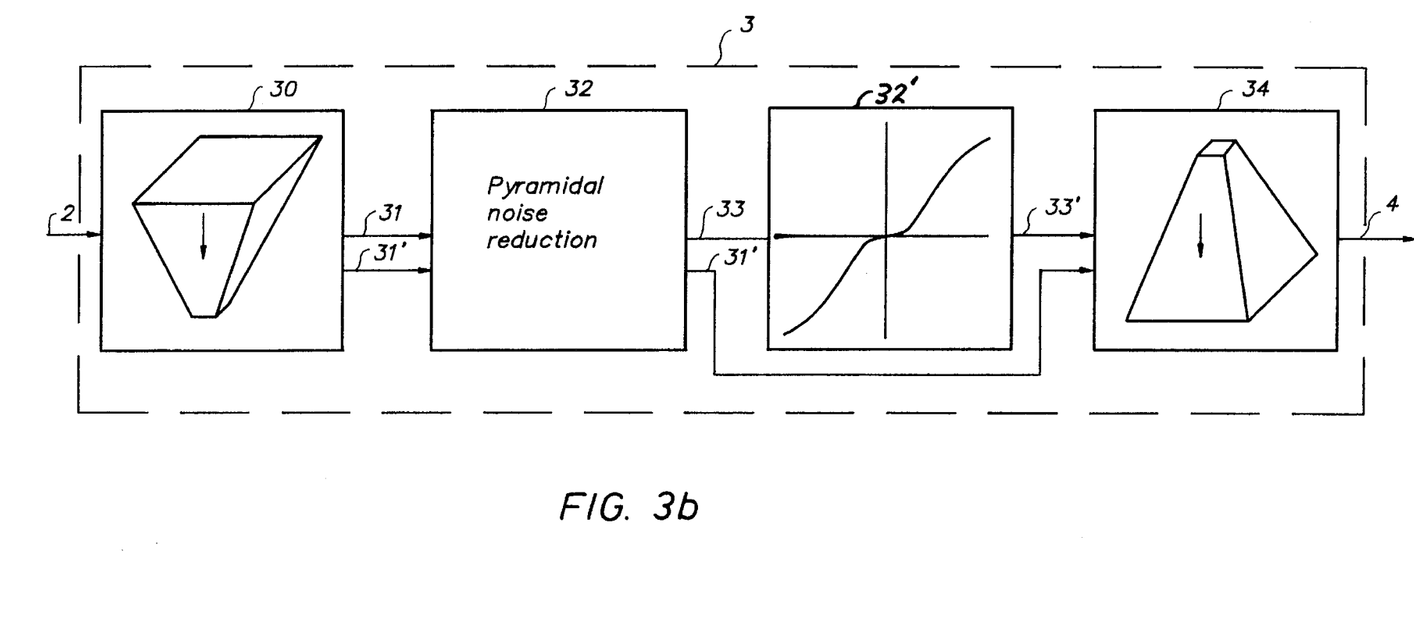
FIG. 3b is a block scheme of an alternative embodiment of the noise reducing section completed with an additional device for contrast enhancement.

FIG. 3b shows a block diagram of an alternative embodiment of the noise reduction section according to the present invention, which includes an additional device 32' for boosting the image contrast immediately after noise reduction. Enhanced contrast is achieved by modifying the pixels of the noise reduced detail images according to a non-linear monotonically increasing odd mapping function to yield modified detail images 33, and supplying these modified detail images to the reconstruction section 34.

With this combination of edge preserving noise suppression and contrast enhancement applied to computed radiography images, excellent contrast can be achieved without boosting the inherent noise to a disturbing level.

Figure 4A:
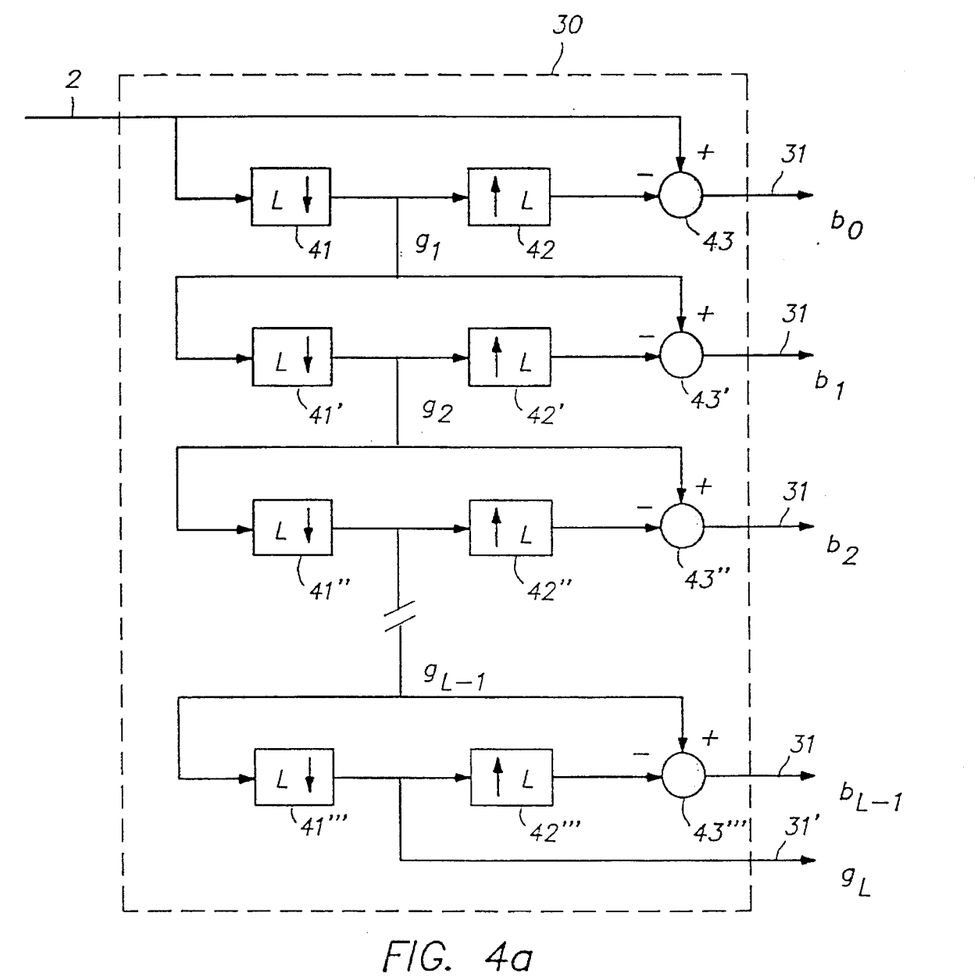
FIG. 4a illustrates one way of performing the decomposition step in the method of the invention.

A preferred embodiment of the decomposition process is depicted in FIG. 4a. The original image is filtered by means of a low pass filter 41, and subsampled by a factor of two, which is implemented by computing the resulting low resolution approximation image $g_1$ only at every other pixel position of every alternate row.

A detail image $b_0$ at the finest level is obtained by interpolating the low resolution approximation $g_1$ with doubling of the number of rows and columns, and pixelwise subtracting the interpolated image from the original image 2.

The interpolation is effectuated by the interpolator 42, which inserts a column of zero values every other column, and a row of zero values every other row respectively, and next convolves the extended image with a low pass filter. The subtraction is done by the adder 43.

The same process is repeated on the low resolution approximation $g_1$ instead of the original image 2, yielding an approximation of still lower resolution $g_2$ and a detail image $b_1$ using adders 43', 43", 43'".

A sequence of detail images $b_i$, i=0..L-1 and a residual low resolution approximation $g_L$ are obtained by iterating the above process L times. The finest detail image $b_0$ has the same size as the original image. The next coarser detail image $b_1$ has only half as many rows and columns as the first detail image $b_0$. At each step of the iteration the maximal spatial frequency of the resulting detail image is only half that of the previous finer detail image, and also the number of columns and rows is halved, in accordance with the Nyquist criterion. After the last iteration a residual image $g_L$ 31' is left which can be considered to be a very low resolution approximation of the original image. In the extreme case it consists of only 1 pixel which represents the average value of the original image 2.

Figure 4B:
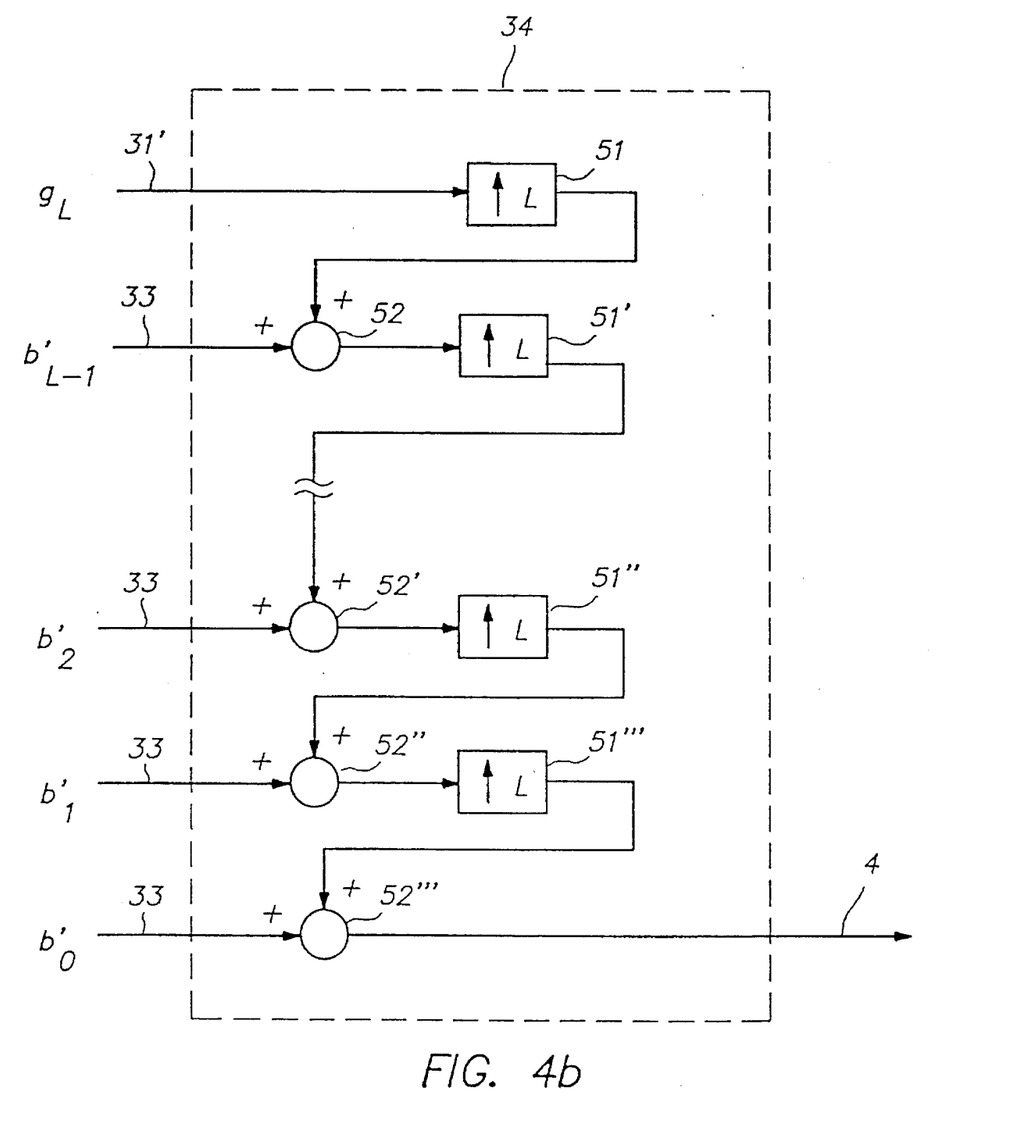
FIG. 4b illustrates the corresponding reconstruction process.
Figure 4C:
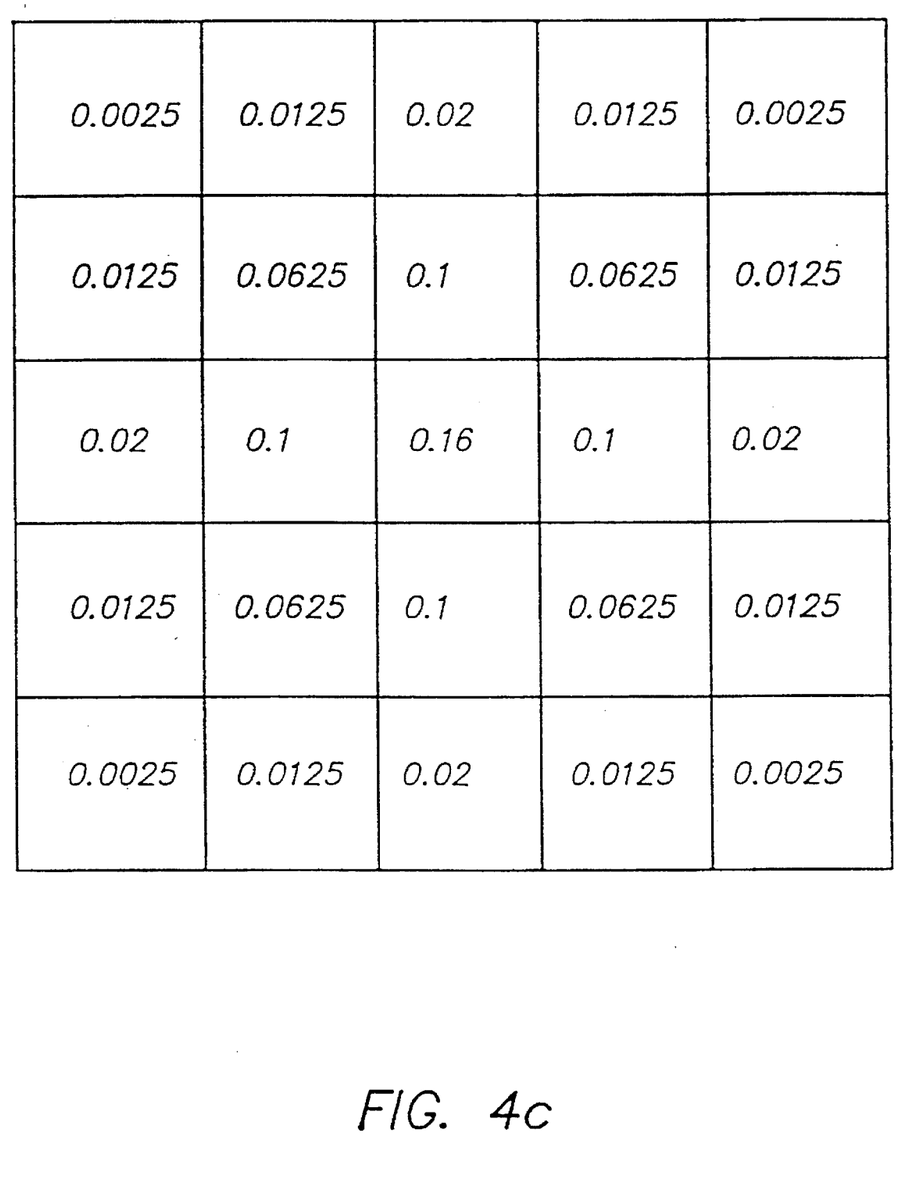
FIG. 4c shows the coefficients of an example of a Gaussian filter.

The filter coefficients of the low pass filter of the preferred embodiment are presented in FIG. 4c. They correspond approximately to the samples of a two dimensional gaussian distribution on a 5×5 grid. The same filter coefficients are used for the low pass filters 41, 41', ... 41'" at all scales.

The same filter kernel with all coefficients multiplied by 4 is also used within the interpolators 42, 42', ... 42'". The factor of 4 compensates for the insertion of zero pixel columns and rows as explained above.

The corresponding reconstruction process is depicted in FIG. 4b. The residual image is first interpolated by interpolator 51 to twice its original size and the interpolated image is next pixelwise added to the detail image of the coarsest level $b'_{L-1}$, using adder 52.

The resulting image is interpolated and added to the next finer detail image. If this process is iterated L times using the unmodified detail images $b_{L-1} \ldots b_0$ then an image equal to the original image 2 will result.

If at the other hand the detail images are modified before reconstruction according to the findings of the present invention, then an image with reduced noise level will result. The interpolators 51, 51'. .. 51'" are identical to those used in the decomposition section.

Other embodiments of the pyramidal decomposition and reconstruction section 30 and 34 are based on hierarchically applying image transforms using basis functions, which may be orthogonal. A few embodiments of this category are described extensively in the already mentioned unpublished European patent application 91202079.9 filed Aug. 14, 1991 along with an embodiment comparable to the one described above but without subsampling.

Figure 5:
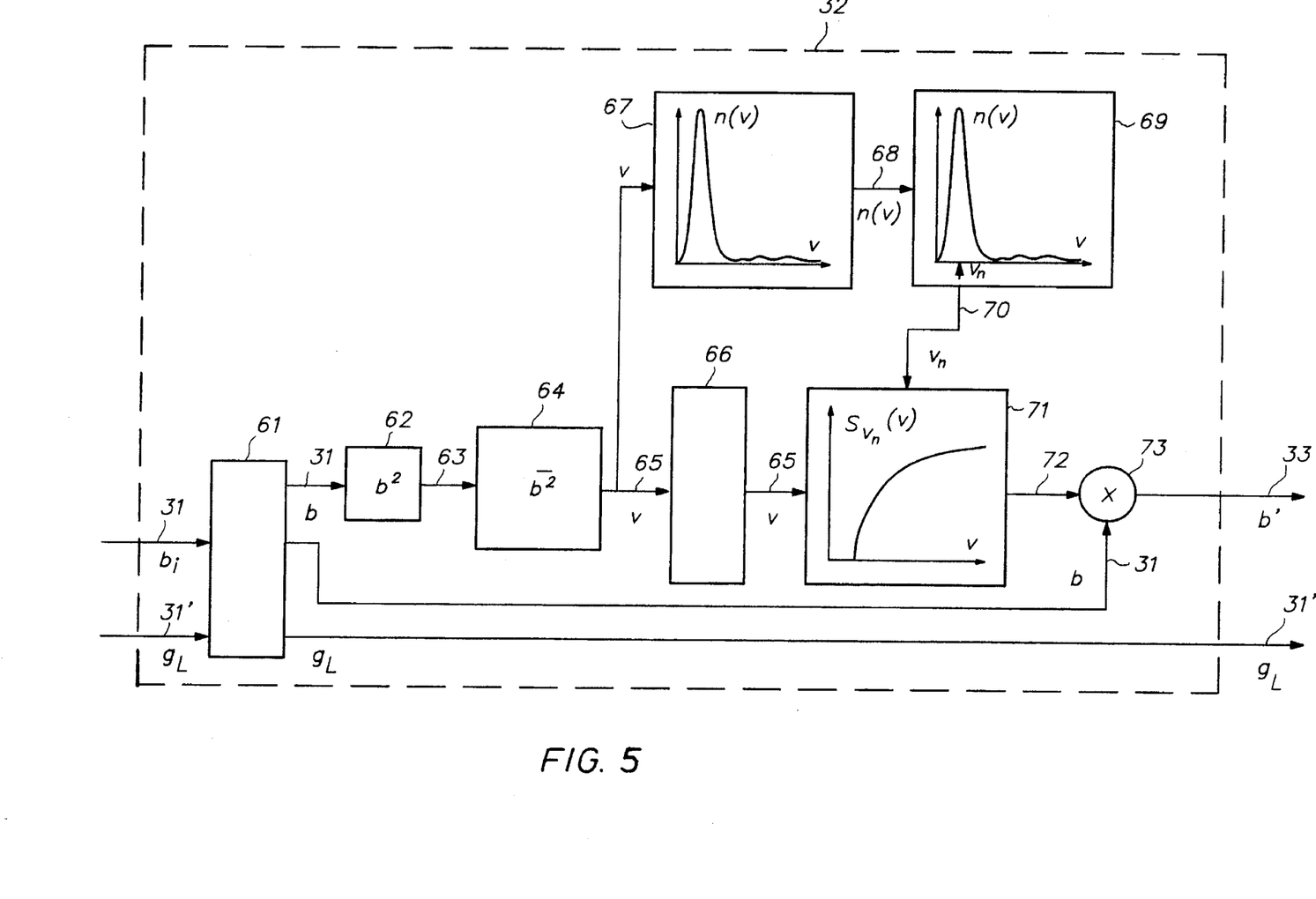
FIG. 5 illustrates an embodiment of a pyramidal noise reduction section.

A preferred embodiment of the pyramidal noise reduction section 32 in accordance with the findings of the present invention is depicted in FIG. 5.

It comprises a memory 61 for temporarily storing the detail images 31 resulting from the decomposition stage, and the residual image. Each detail image $b_i$ stored in the memory is next pixelwise transferred to a squaring unit 62 to yield squared detail images 63, starting with the coarsest detail image. A moving average operator 64 then computes the local variance v at every pixel position by summing all squared pixel values in an N×N neighborhood centered around the current target pixel (a neighborhood of 15×15 elements proved to be adequate), and dividing the sum by the number of pixels in the neighborhood. These local variance pixels 65 are temporarily stored in a second memory 66, and are transferred at the same time to a histogram computation unit 67. A histogram is an array, the elements of which are called bins, each bin corresponding to a fixed sampling interval of the signal range associated with the horizontal histogram axis. Each bin resides in a memory cell, all of them being initialized to zero before accepting the first pixel. For each entered variance value the histogram computation unit 67 selects the corresponding bin index and increments the associated bin value by one. After all pixels of a variance image 65 at a particular resolution level have been used this way, the histogram represents the occurrence of every quantized variance value throughout the image.

This local variance histogram 68 is next supplied to a maximum locator 69, which determines the variance value with the highest occurence $v_n$ in the histogram. This value is used as an estimate for the noise variance within the considered detail image.

The soundness of this estimation technique has been proven by two experimental studies.

In a first experiment we used the above method to compute the histogram of the local variance of the detail images obtained from pyramidal decomposition of natural images containing uniform additive zero-mean band-limited noise.

Inspecting the results we found that the detail variance histograms corresponding to the finest resolution levels in the pyramidal decomposition, are unimodal with a very narrow peak near zero, and very low occurences corresponding to the higher variance values. This is in accordance with the fact that the majority of the pixels in the finer detail images carry no image detail, but all of them are affected by noise, hence the highest peak merely corresponds to the noise distribution.

Furthermore this peak is very narrow since the variance of the noise, locally measured, is uniform across the image.

Figure 6:
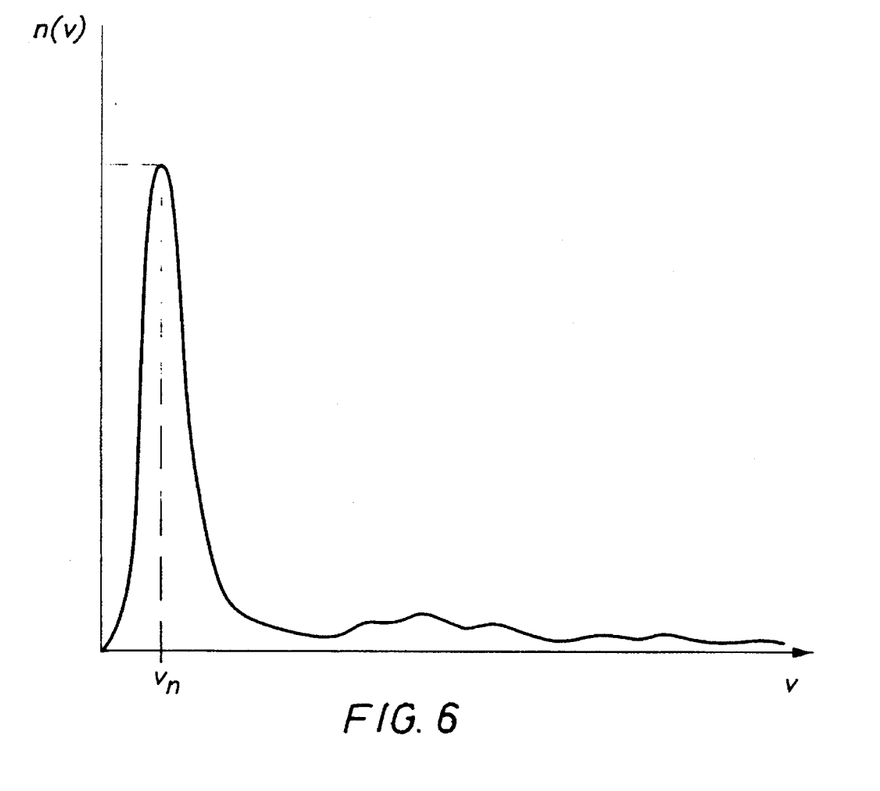
FIG. 6 is a variance histogram.

A typical histogram is sketched in FIG. 6. In the histograms corresponding to the detail variance images of increasing coarseness, we found that the dominance of the peak near zero diminishes gradually with respect to the local occurrence maxima at higher variance values. This is explained by the fact that in the coarser images the noise is substantially less, and the majority of pixels carry significant image detail, the variance of which is fluctuating across the image, so the histogram shape may not be unimodal anymore.

In a second experiment the above method for estimating the noise variance $v_n$ in each of the detail images was applied to a series of digital images which were generated by adding a different amount of gaussian noise to the same original image, doubling the noise variance for each consecutive picture.

For each resolution level the resulting noise variance figures were compared with each other, and in the case of the finest resolution images, the computed noise variances differed by a factor of two as expected. This experiment confirmed the validity of our noise estimation method for the finer resolution detail images.

Referring to FIG. 5 a preferred embodiment of the actual noise suppression method is described next. The noise variance $v_n$ 70 determined by the maximum locator is used as a parameter in the noise suppression function $S_{v_n}(v)$, which is defined as:

$$S_{v_n}(v) = 0 \quad \text{if } v <= K * v_n \quad (1)$$
$$S_{v_n}(v) = 1 - K * v_n/v \quad \text{otherwise}$$

where K is a fixed noise suppression factor which determines the amount of noise suppression to be applied; K=0 implies no noise suppression. The threshold $K*v_n$ on the argument v accounts for the fact that statistical variation may cause the local variance v to be smaller than $v_n$, in which case negative values of $S_{v_n}$ would result without thresholding.

Figure 7:
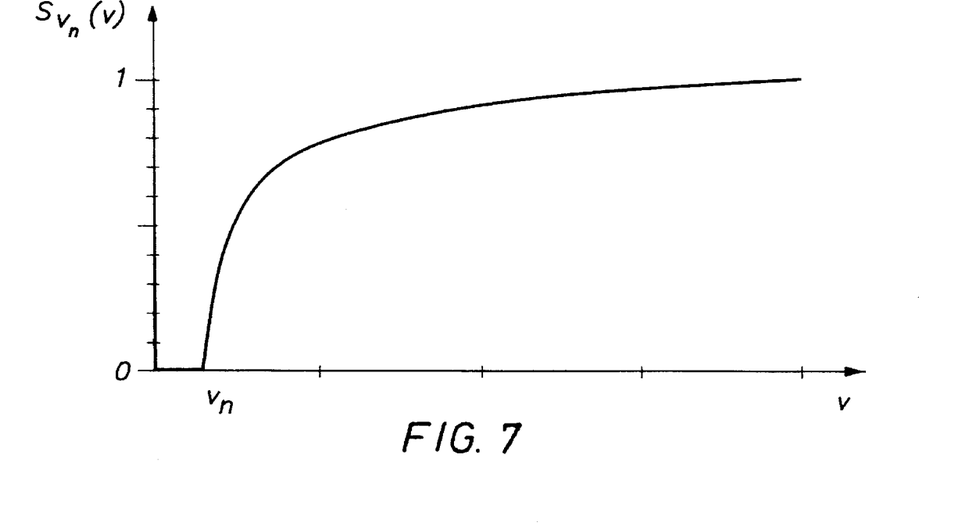
FIG. 7 is a plot of a noise suppression function.

FIG. 7 shows an example plot of the noise suppression function, for K=1. This function is computed and installed as a noise suppression lookup table 71 for every detail image within the decomposition.

After a noise suppression lookup table corresponding to a particular resolution level has been installed, all variance pixels 65 corresponding to the same level are fetched from the memory 66, and transformed into a sequence of attenuation coefficients 72. The resulting pixels 33 are computed by pixelwise multiplying by means of multiplier 73 these coefficients with the pixels of the detail image at the same level, fetched from the memory 61.

This whole process is repeated for all detail images up to the finest resolution level, to yield the attenuated detail images $b'_i$ 33, which are finally transferred to the reconstruction section 34 along with the unaltered residual image 31', according to the flow depicted in FIG. 3a.

As a result of the above computations all detail pixels whose local variance considerably exceeds the noise variance corresponding to the same resolution level are likely to carry significant image detail and will be left nearly unaltered, while those detail pixels at image positions where the local variance is comparable to the noise variance, are attenuated appreciably since these are not assumed to represent useful information, but merely noise. The shape of the noise suppression function $S_{v_n}(v)$ determines the gradual transition from maximal to no attenuation. Although many functional models will serve the above purpose, any suitable noise suppression function in accordance with the findings of the present invention should have a very steep slope at the abscissa that corresponds to the lowest detail variance that is considered to be relevant, which is normally the noise level, or some fixed fraction K of it. The larger this noise suppression factor K is chosen, the larger the effect of noise suppression will be, but at the same time the risk of suppressing a subtle detail of interest increases, so care must be taken when choosing a K-value greater than 1.

The above formulation (1) of noise suppression as a function of local variance has strong statistical support as we found from the following theoretical derivation, assuming zero mean additive uncorrelated noise:

Let x represent the unknown noise free approximation image at some resolution level i (pixel indices are omitted), let $\hat{x}$ denote the noise filtered approximation image at the same level, at corresponding pixel positions, let n be the unknown noise component alt level i, and let z represent the observed approximation image, i.e. the unfiltered approximation image $g_i$ which would be obtained if reconstruction were applied to the unmodified detail images and the residual image, up to level i:

$$z = x + n \quad (2)$$

No further statistical model is needed for the signal x: we use the image itself to estimate at every pixel the a priori mean $x_{mean}$ and variance $v_x$. Then from (2) one finds $$x_{mean} = z_{mean} \quad (3)$$

where $z_{mean}$ is the local average of the observed image z, and $$v_x = v - v_n \quad (4)$$

in which v denotes the local variance of the unfiltered signal z, $v_n$ the noise variance 70 as determined by the maximum locator, and $v_x$ the estimated local variance of the unknown noise free signal. We consider a linear filter of the form $$\hat{x} = r\, x_{mean} + s\, z \quad (5)$$

where $\hat{x}$ is the minimum mean square estimate of x searched for, and r and s are chosen to minimize the norm J $$J = E[(x - \hat{x})^2] \quad (6)$$

in which E denotes the expectation operator. By substituting equations (3) and (5) into (6), and setting the following partial derivatives to zero:

$$\frac{dJ}{dr} = \frac{dJ}{ds} = 0 \tag{7}$$

yields $$E[x_{mean}(x - r\, x_{mean} - s\, z)] = 0$$

(8)
and $$E[z(x - r\, x_{mean} - s\, z)] = 0$$

(9)
From (3) and (8) one obtains $$r = 1 - s \tag{10}$$

From (9) and (10), and using (3) it follows $$E[z(x - x_{mean}) - s\, z(z - z_{mean})] = 0 \tag{11a}$$

By only substituting z in the first term by (2) and using (4) one obtains $$s = \frac{v_x}{v} = 1 - \frac{v_n}{v} \tag{11b}$$

Equation (11b) forms the basis of the noise suppression function eq. (1) described above. The filter equation (5) then rereads as $$\hat{x} = z_{mean} + s(z - z_{mean}) \tag{12}$$

Each stage of the very efficient implementation of pyramidal noise suppression using noise suppression functions as described above is equivalent to the optimal filter (12) if the local average $z_{mean}$ in (12) is computed as the previous coarset approximation of z within the pyramid, i.e. the approximation image $g_{i+1}$, after proper interpolation to the same size as z. With this implementation the computation of the local average $z_{mean}$ does not require additional computation power, since it is computed anyhow at each stage of the reconstruction process as described above. If the local average is computed this way, then the term $(z - z_{mean})$ in (12) exactly corresponds to the detail image $b_i$ 31. With this efficient implementation the noise filtering (12) simply reduces to pixelwise multiplying the detail images by the corresponding coefficients s (which in our preferred embodiment correspond to the appropriate values of the noise suppression function), and perform the reconstruction using the thus modified detail images $b'_i$ 33, which correspond to the term $b\,(z - z_{mean})$ in 12. This is repeated up to the finest resolution level, so the approximation images resulting from the adders 52, 52'. . . 52''' each correspond to the optimal estimate $\hat{x}$ of the noise free approximation x at the corresponding resolution level.

In most natural images the noise is not restricted to a very narrow spatial frequency band but extends across many octaves. If one tries to smooth the noise with a fixed sized convolution filter that covers the whole spatial frequency band of the noise, then important image details are likely to be blurred or suppressed. Ideally both the degree of smoothing and the filter size must be adapted to the local image statistics. In the above noise suppression method the degree of smoothing is adapted to the locally estimated amount of image variance. The problem of adaptively sizing the filter kernel which is hard to solve, is circumvented in the above method by consecutively applying the noise suppression operation to a particular detail image that only contains that portion of the pictorial information that is restricted to a narrow spatial frequency band.

The smoothing itself is embedded in the low pass filtering 41 and subsequent interpolation 42. The degree to which every detail pixel $b_i$ is suppressed determines the proportional contribution of the remaining low pass component at that resolution level to the accumulated resulting pixel value.

The noise level obviously decreases at every coarser resolution level, therefore it is estimated at every individual level for optimal adaptation. Since the noise variance level decreases rapidly with increasing coarseness the decomposition process may be terminated after only a few iterations, typically 3 to 5. This is a practical limit to the number of resolution levels L at which noise suppression is to be applied in most cases.

As a result of the above noise reduction method the overall image acuity may somewhat diminish. This is due to the fact that the noise components are more prominent in the finer resolution detail images than in the coarser ones, hence detail images of the finer resolution levels on the average will be attenuated more than the coarser detail images. In order to compensate for this general trend of high spatial frequency attenuation it may be desirable to explicitly amplify the finer detail images relatively to the coarser detail images before reconstruction. An embodiment of such a compensation method is described next.

For each resolution level at which noise reduction is applied according to the present invention, the average value of the noise attenuation coefficients 72 across the image is computed. This computation can be done more efficiently by considering each local variance value on the abscissa axis of the local variance histogram 68, computing the corresponding noise attenuation coefficient using the noise suppression lookup table 71, multiplying this attenuation coefficient by the histogram frequency of the considered local variance, summing this quantity across all histogram bins, and dividing the final sum by the number of bins.

The desired compensation is performed by amending the noise suppression lookup tables 71 before these are used for attenuating the detail images according to the present invention, the amendment being such that each said lookup table is divided by the above average noise attenuation coefficient of the corresponding resolution level if full acuity loss compensation is desired, or alternatively that each said lookup table is divided by a value which is larger than said average noise attenuation coefficient, but smaller than one if only partial compensation is desired.

A method to control said acuity loss compensation is implemented by means of the following noise suppression functions:

$$S_{v_n}(v) = 0 \qquad \text{if } v <= K * v_n$$

$$S_{v_n}(v) = (1 - K * v_n/v) * (1 + C(1/A - 1)) \qquad \text{otherwise,}$$

(13) where A is the average of the function $S_{v_n}(v)$ as defined by (1) evaluated across the entire corresponding image, and C is a parameter within the range 0 . . . 1, which specifies the desired relative amount of compensation for acuity loss.

If for some specific application the images have fairly constant noise statistics, then the detail image noise variances will also remain constant and can be computed in advance for the whole class of images representative of the application field. In an alternative embodiment these predetermined noise variance values are stored in a table. This way it is no longer required to compute the histogram, hence the histogram computation section 67 and maximum locator 69 are omitted. The memory 66 is not needed neither, since the local variance values 65 can be fed to the noise suppression lookup table 71 directly as they become available from the local averaging unit 64.

Even the noise suppression functions corresponding with all resolution levels may be precomputed and stored into a table.

When the detail images are enhanced according to one of the above methods, and next accumulated in the previously described reconstruction section according to the above reconstruction methods, then the dynamic range of the resulting signal will deviate from the original range, and even to a large extent if contrast boosting is applied to the detail images after noise reduction as described above.

Therefore the resulting image signal is ultimately reduced to the dynamic range of the original image signal, or even smaller. In a preferred embodiment the above reduction of dynamic range is accomplished by means of a lookup table, which maps said reconstructed image signal to an output signal which represents the desired screen brightness or film density. The mapping is monotonic and may be linear or curved, depending on the desired gradation.

We claim:

1. A method for reducing noise in a digital image represented by an array of pixel values by processing said image, said processing comprising the steps of:
    a) decomposing said image into a multiresolution representation comprising a set of detail images at multiple resolution levels and a residue,
    b) estimating the noise level in each detail image or recalling said noise level from a noise table comprising predetermined typical noise level values corresponding to detail images with similar noise statistics;
    c) establishing a local observation neighborhood around each pixel of each detail image and estimating local image content within said neighborhood,
    d) pixelwise attenuating the detail images as a function of the estimated amount of image content and in accordance with said estimated noise level,
    e) computing said processed image by applying a reconstruction algorithm to the residue and to the attenuated detail images, said reconstruction algorithm being such if it were applied to the residual image and the detail images without attenuation, then said digital image or a close approximation thereof would be obtained.

2. A noise reducing method according to claim 1 wherein the dynamic range of the processed image is reduced by mapping the processed image onto a desired output dynamic range according to some specified gradation curve.

3. A method according to claim 1 wherein said digital image is obtained by reading out a radiation image stored in a photostimulable phosphor screen.

4. A noise reducing method according to claim 1 wherein the multiresolution representation has a pyramidal structure, such that the number of pixels in each detail image decreases at each coarser resolution level.

5. A noise reducing method according to claim 1 wherein the detail image at the finest resolution level is obtained as the pixelwise difference between the original image and an image obtained by low pass filtering the original image, and wherein the successive coarser resolution level detail images are obtained by taking the pixelwise difference between two low pass filtered versions of the original image, the second filter having a smaller bandwidth than the former.

6. A noise reducing method according to claim 1 wherein said multiresolution decomposition comprises at least one and at most five detail images and a residue.

7. A noise reducing method according to claim 1 wherein the detail images at successively coarser resolution levels are obtained as the result of each of K iterations of the following steps:
    a) computing an approximation image at a next coarser level by applying a low pass filter to the approximation image corresponding to the current iteration, and subsampling the result in proportion to the reduction in spatial frequency bandwidth, using the original image as input to said low pass filter in the course of the first iteration;
    b) computing a detail image as the pixelwise difference between the approximation image corresponding to the current iteration and the approximation image at a next coarser resolution level computed according to the method of step a) of claim 1 wherein the multiresolution representation has e pyramidal structure, such that the number of pixels in each detail image decreases at each coarser resolution level, and wherein both images are brought into register by proper interpolation of the latter image;

and wherein said residue is a residual image that is equal to the approximation image produced by the last iteration;

and wherein said processed image is computed by iterating K times the following procedure starting from the coarsest detail image and the residual image:

computing the approximation image at the current resolution level by pixelwise adding the detail image at the same resolution level to the approximation image at the coarser resolution level corresponding to the previous iteration, both images being brought into register by proper interpolation of the latter image; using the residual image instead of said coarser approximation image in the course of the first iteration.

8. A noise reducing method according to claim 7 wherein said subsampling is performed with a factor of 2, and said low-pass filter has an impulse response which approximates a two-dimensional gaussian distribution.

9. A method according to claim 1 wherein said multiresolution representation is obtained by applying a transform to said digital image yielding detail transform images at multiple resolution levels and a residual coefficient, each detail transform image comprising a set of transform coefficients expressing the relative contribution to the original image of the corresponding basis function out of a set of predetermined basis functions, each of said functions representing local detail at a specific resolution level and being nonperiodic, and having zero mean value, and wherein said transform is such that there exists an inverse transform which returns the original image or a close approximation thereof when being applied to said transform coefficients and said residual coefficient.

10. A noise reducing method according to claim 9 wherein said basis functions are orthogonal.

11. A noise reducing method according to claim 10 wherein said functions are discrete wavelets.

12. A noise reducing method according to claim 1 wherein a loss of acuity due to the stronger noise suppression in the finer detail images or detail transform images is compensated for by pixelwise multiplying each of the detail images with a factor which is larger for the finer resolution levels than it is for the coarser levels.

13. A noise reducing method according to claim 12 modified in that said noise suppression functions are defined as:

$$S_{v_n}(v) = 0 \quad \text{if } v <= K * v_n$$
$$S_{v_n}(v) = (1 - K * v_n/v) * (1 + C(1/A - 1)) \quad \text{otherwise}$$

where A is the average of the function $S_{v_n}(v)'$ defined as:

$$S_{v_n}(v)' = 0 \quad \text{if } v <= K * v_n$$
$$S_{v_n}(v)' = 1 - K * v_n/v \quad \text{otherwise}$$

where $S_{v_n}$ is the noise suppression function corresponding to a noise variance $v_n$, where v represents the local variance, and where K is a noise suppression factor which specifies the amount of noise suppression to be applied said function $S_{v_n}'$ being evaluated across the entire corresponding image, and C is a parameter within the range 0 ... 1, which specifies the desired relative amount of compensation for acuity loss.

14. A noise reducing method according to claim 13 wherein said attenuated detail images are additionally converted by means of a contrast enhancing non-linear monotonically increasing odd mapping function having a slope that gradually decreases with increasing absolute argument values.

15. A noise reducing method according to claim 1 wherein said digital image is preprocessed in such a way that its noise characteristics are approximately uniform, additive, band-limited and have zero mean value.

16. A noise reducing method according to claim 15 wherein said preprocessing consists of converting pixel values of said digital image into the square root of said pixel values.

17. A noise reducing method according to claim 1 wherein said noise level is determined as the estimated noise variance in each detail image.

18. A noise reducing method according to claim 17 wherein a set of noise suppression functions are computed, each function associated with one of said detail images, said functions being monotonically non-decreasing in one variable and parametrically depending on said noise variance in a non-increasing monotonic way and said functions being positive and asymptotically reaching a maximum value equal to one and wherein each detail image is attenuated by multiplying it by the associated noise suppression function evaluated at an abscissa equal to said local detail image variance.

19. A noise reducing method according to claims 17 wherein said estimation of the noise variance in an image comprises the steps of:
   a) establishing a compact neighborhood around each pixel of said image, computing the local variance at each center pixel based on the statistics within said neighborhood, and using said local variance at every pixel to update the corresponding entry of a local variance histogram associated with said image;
   b) designating the noise variance of said image as the local variance value that corresponds to the highest number of occurences within said histogram.

20. A noise reducing method according to claim 19 wherein said local variance is computed as the average squared value of all pixels within said neighborhood.

21. A noise reducing method according to claim 18 wherein said noise suppression functions are such that the statistical expected value of the noise power in the reconstructed image is minimal.

22. A noise reducing method according to claim 18 wherein said noise suppression functions are defined as:

$$S_{v_n}(v) = 0 \quad \text{if } v <= K * v_n$$
$$S_{v_n}(v) = 1 - K * v_n/v \quad \text{otherwise}$$

where $S_{v_n}$ is the noise suppression function corresponding to a noise variance $v_n$, where v represents the local variance, and where K is a noise suppression factor which specifies the amount of noise suppression to be applied.

23. An apparatus for processing an electronic representation of an image comprising
   means (30) for decomposing said electronic representation into a sequence of detail images at multiple resolution levels and a residual image at a resolution level lower than the minimum of said multiple resolution levels,
   means (61) for storing said detail images,
   means (62–70) for estimating the noise level in each detail image or recalling said noise level from a noise table comprising predetermined typical noise level values corresponding to detail images with similar noise statistics;
   means (62–66) for estimating local image content within a neighborhood around each pixel in each said detail image
   means (71,73) for pixelwise attenuating each detail image as a function of said local image content in accordance with said estimated noise level,
   means (34) for computing said processed image by applying a reconstruction algorithm to the residual image and the attenuated detail images, said reconstruction algorithm being such that if it were applied to the residual image and the detail images without attenuation, then an original image or a close approximation thereof would be obtained.

24. An apparatus according to claim 23 comprising means for reading out detail images at each resolution level from storage means (61),
   means (62,64) for computing the local variance of pixels in a neighborhood at each position in said detail images,
   means (66) for storing said local variance pixels,
   a histogram computation circuit (67) for computing at each resolution level the histogram of the computed local variance values,
   a maximum locator (69) for estimating the noise variance as the variance value with the highest occurrence within said histogram,
   means (71) for pixelwise computing an attenuation coefficient as a function of local variance at each pixel in said detail images, in accordance with said noise variance at the corresponding resolution level,
   and a multiplier (73) for pixelwise multiplying each detail image at a particular resolution level with the corresponding attenuation coefficients.

25. Apparatus according to claim 23 additionally comprising an image acquisition section (1) comprising an apparatus (14–19) for reading out a radiation image stored in a photostimulable phosphor screen by scanning said screen with stimulating radiation, detecting the light emitted upon stimulation and converting the detected light into an electronic representation.

* * * * *